(12) United States Patent
Bozzano et al.

(10) Patent No.: US 8,686,204 B2
(45) Date of Patent: Apr. 1, 2014

(54) METHODS FOR CO-PROCESSING BIORENEWABLE FEEDSTOCK AND PETROLEUM DISTILLATE FEEDSTOCK

(75) Inventors: Andrea G. Bozzano, Northbrook, IL (US); Donald Eizenga, Elk Grove Village, IL (US); Ralph Charles Norton, Mission Viejo, CA (US)

(73) Assignee: UOP LLC, Des Plaines, IL (US)

( * ) Notice: Subject to any disclaimer, the term of this patent is extended or adjusted under 35 U.S.C. 154(b) by 684 days.

(21) Appl. No.: 12/941,420

(22) Filed: Nov. 8, 2010

(65) Prior Publication Data

US 2012/0116134 A1    May 10, 2012

(51) Int. Cl.
  *C07C 1/00*    (2006.01)

(52) U.S. Cl.
  USPC .............................. 585/240; 585/242; 208/89

(58) Field of Classification Search
  USPC ................ 585/240, 242; 44/605, 606; 208/89
  See application file for complete search history.

(56) References Cited

U.S. PATENT DOCUMENTS

| | | | | |
|---|---|---|---|---|
| 4,992,605 A * | 2/1991 | Craig et al. | | 585/240 |
| 5,705,722 A * | 1/1998 | Monnier et al. | | 585/240 |
| 7,550,634 B2 * | 6/2009 | Yao et al. | | 585/240 |
| 7,781,629 B2 * | 8/2010 | Marchand et al. | | 585/240 |
| 7,872,165 B2 * | 1/2011 | Bertoncini et al. | | 585/240 |
| 8,067,657 B2 * | 11/2011 | Santiago et al. | | 585/733 |
| 8,193,399 B2 * | 6/2012 | Gosling | | 585/14 |
| 8,288,599 B2 * | 10/2012 | Yanik et al. | | 585/240 |
| 8,366,910 B2 * | 2/2013 | Gomes et al. | | 208/89 |
| 2006/0186020 A1 * | 8/2006 | Gomes | | 208/46 |
| 2008/0161614 A1 | 7/2008 | Bertoncini et al. | | |
| 2009/0166256 A1 * | 7/2009 | Lewis et al. | | 208/89 |
| 2009/0229172 A1 | 9/2009 | Brady et al. | | |
| 2010/0083563 A1 | 4/2010 | Miller | | |

FOREIGN PATENT DOCUMENTS

FR    2933101 A1    1/2010

OTHER PUBLICATIONS

Lappas, A. A., Production of biofuels via co-processing in conventional refining processes, Catalysis Today, v 145, n 1-2, p. 55-62, Jul. 15, 2009.

* cited by examiner

*Primary Examiner* — Nina Bhat
(74) *Attorney, Agent, or Firm* — Maryann Maas

(57) ABSTRACT

Methods for co-processing a biorenewable feedstock and a petroleum distillate feedstock are provided. The petroleum distillate feedstock containing sulfur is reacted with hydrogen gas in the presence of a hydrotreating catalyst thereby forming an effluent mixture comprising hydrogen sulfide. A combined feed comprising the effluent mixture, optionally a recycle liquid, and the biorenewable feedstock is contacted with hydrogen gas in a reaction zone with a deoxygenation catalyst under reaction conditions to provide a reaction product comprising a hydrocarbon fraction. The combined feed comprises greater than 50 weight percent biorenewable feedstock.

16 Claims, 4 Drawing Sheets

METHODS FOR CO-PROCESSING BIORENEWABLE FEEDSTOCK AND PETROLEUM DISTILLATE FEEDSTOCK

FIELD OF THE INVENTION

The present invention generally relates to methods for producing renewable fuels and chemicals from biorenewable sources, and more particularly relates to methods for co-processing biorenewable feedstock and petroleum distillate feedstock.

DESCRIPTION OF RELATED ART

As the worldwide demand for fuel increases, there is increasing interest in sources other than crude oil for producing diesel fuel. One source of interest is biorenewable sources, such as vegetable oils and animal fats. A conventional catalytic hydroprocessing process known for converting a biorenewable feedstock into green diesel fuel may be used as a substitute for the diesel fuel produced from crude oil. The highly exothermic process also supports the possible co-production of propane and other light hydrocarbons, as well as naphtha or green jet fuel. As used herein, the terms "green diesel fuel" and "green jet fuel" refer to fuel produced from biorenewable sources, in contrast to those produced from crude oil.

To produce the green diesel fuel, the biorenewable feedstock is combined with hydrogen, brought to reaction temperature, and is then sent to a reactor where the biorenewable feedstock is converted in the presence of a deoxygenation catalyst into a reaction product. The reaction product comprises a liquid fraction and a gaseous fraction. The liquid fraction comprises a hydrocarbon fraction containing n-paraffins. Although this hydrocarbon fraction is useful as a diesel fuel, it has poor cold flow properties. To improve the cold flow properties of the hydrocarbon fraction, the liquid fraction may be contacted with an isomerization catalyst under isomerization conditions to at least partially isomerize the n-paraffins to iso-paraffins. Whether isomerization is carried out or not, the liquid fraction is separated from the gaseous fraction and sent to a fractionation unit to produce the green diesel fuel. The green diesel fuel meets ultra-low sulfur diesel specifications.

The deoxygenation catalyst used in the process must remain sulfided to maintain its performance, but the water from deoxygenation tends to strip sulfur from the catalyst. Separate catalyst sulfiding systems providing an external source of a sulfiding agent (usually $H_2S$) are typically required to maintain the deoxygenation catalyst in its sulfided form. Unfortunately, $H_2S$ is an expensive additive and the separate systems increase processing complexity and cost.

$H_2S$ may be produced from desulfurizing sulfur-containing petroleum distillate feedstock that refiners typically have in abundant supply. Refiners have tried to co-process petroleum distillate feedstock and biorenewable feedstock in a single hydrotreating reactor using only a small percentage of biorenewable feedstock (typically less than 20%, but only as much as 50%) and a much larger percentage of petroleum distillate feedstock, resulting in limited production of green diesel fuel and the deoxygenation reaction competes with the desulfurization reaction disadvantageously imposing more severe processing conditions. Refiners have tried increasing the percentage of biorenewable feedstock, but the deoxygenation reaction suppresses the production of $H_2S$ from the petroleum-derived feedstock.

Accordingly, it is desirable to provide a method for co-processing a biorenewable feedstock and a petroleum distillate feedstock to produce a hydrocarbon fraction that will provide a green diesel fuel and maintain the deoxygenation catalyst in a sulfided form, thereby reducing the amount of or eliminating the external sulfiding agent. It is also desirable to provide a method that helps improve the cold flow properties of the hydrocarbon fraction, helps moderate the high heat of reaction, and helps minimize the required heat input while producing the hydrocarbon fraction.

Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods are provided for co-processing a biorenewable feedstock and a petroleum distillate feedstock. In accordance with one exemplary embodiment, the method comprises reacting a petroleum distillate feedstock containing sulfur with hydrogen gas in the presence of a hydrotreating catalyst thereby forming an effluent mixture comprising hydrogen sulfide. A combined feed comprising the effluent mixture and the biorenewable feedstock is contacted with hydrogen gas in a reaction zone with a deoxygenation catalyst under reaction conditions to provide a reaction product comprising a hydrocarbon fraction. The combined feed comprises greater than 50 weight percent biorenewable feedstock. The combined feed may further comprise recycle liquid.

Methods are provided for co-processing a biorenewable feedstock and a petroleum distillate feedstock in accordance with yet another exemplary embodiment of the present invention. The method comprises the steps of providing a petroleum distillate feedstock containing sulfur. The petroleum distillate feedstock is contacted with a hydrotreating catalyst under hydrotreating conditions using hydrogen recycle gas or fresh hydrogen gas to convert at least a portion of the sulfur to hydrogen sulfide in an effluent mixture. A combined feed comprising the effluent mixture, a recycle liquid, and the biorenewable feedstock is contacted with a deoxygenation catalyst under reaction conditions using hydrogen gas to provide a reaction product comprising a hydrocarbon fraction and to maintain the deoxygenation catalyst in sulfided form with the hydrogen sulfide.

Methods are provided for co-processing a biorenewable feedstock and a petroleum distillate feedstock in accordance with yet another exemplary embodiment of the present invention. The method comprises the steps of introducing a petroleum distillate feedstock with hydrogen gas into a hydrotreating reactor in the presence of a hydrotreating catalyst under hydrotreating conditions comprising a temperature of about 260° C. to about 454° C., a hydrogen partial pressure of about 2000 kPa to about 14000 kPa, and a liquid hourly space velocity of about 0.5 hr−1 to about 10 hr−1 to form an effluent mixture comprising hydrogen sulfide. The effluent mixture, recycle liquid, and biorenewable feedstock in a combined feed are co-fed to a reaction zone at reaction conditions in the presence of a deoxygenation catalyst to provide a reaction product and to maintain a minimum of at least about 150 ppm sulfur in the combined feed.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to a method for co-processing a biorenewable feedstock and a sulfur-containing petroleum distillate feedstock to produce a hydrocarbon fraction useful as a green diesel fuel and hydrogen recycle gas using a deoxygenation catalyst in a treating reactor under reaction conditions. The deoxygenation catalyst is maintained in a sulfided form by hydrotreating the petroleum distillate feedstock in a hydrotreating reactor to convert at least a portion of the sulfur therein into hydrogen sulfide ($H_2S$) in an effluent mixture that is co-fed with the biorenewable feedstock and optionally, recycle liquid into the treating reactor. As used herein, "hydrotreating" refers to desulfurization and denitrogenation of the petroleum distillate feedstock containing sulfur and nitrogen, as hereinafter described.

Figure 1:
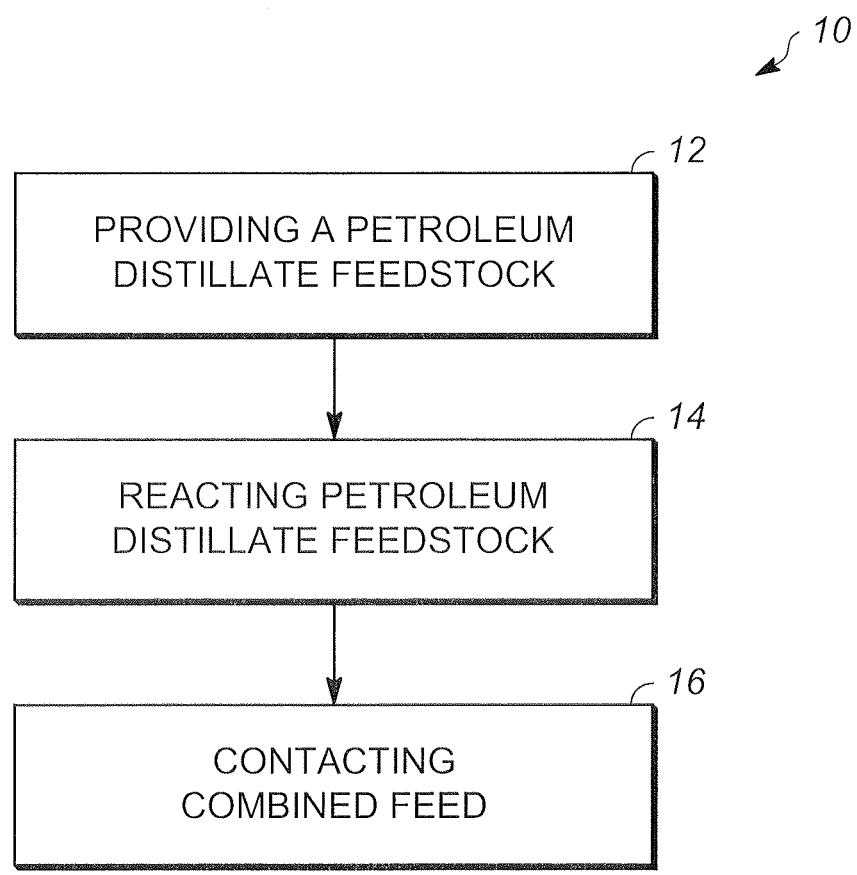
FIG. 1 is a flow diagram of a method for co-processing a biorenewable feedstock and a sulfur-containing petroleum distillate feedstock, according to exemplary embodiments of the present invention.

As shown in FIG. 1, in accordance with an exemplary embodiment, a method 10 for co-processing a biorenewable feedstock and a petroleum distillate feedstock begins by providing a petroleum distillate feedstock 102 (step 12). The petroleum distillate feedstock may be commercially available or available elsewhere in the same refinery used to process biorenewable feedstock into green diesel fuel and other possible co-products. The petroleum distillate feedstock is generally a distillable petroleum-derived fraction having a boiling point range which is above that of naphtha. Suitable petroleum distillate feedstocks that may be obtained from refinery fractionation and conversion operations include middle distillate hydrocarbon streams, such as highly aromatic hydrocarbon streams. Petroleum distillate feedstocks as hereinafter described include distillate hydrocarbons boiling at a temperature greater than about 149° C. (300° F.), typically boiling in the range from about 149° C. (300° F.) to about 399° C. (750° F.), and often boiling in the range from about 204° C. (400° F.) to about 371° C. (700° F.).

Representative petroleum distillate feedstocks include various other types of hydrocarbon mixtures, such as straight-run fractions, or blends of fractions, recovered by fractional distillation of crude petroleum. Such fractions produced in refineries include coker gas oil and other coker distillates, straight run gas oil, deasphalted gas oil, and vacuum gas oil. These fractions or blends of fractions can therefore be a mixture of hydrocarbons boiling in range from about 343° C. (650° F.) about 566° C. (1050° F.), with boiling end points in other embodiments being below about 538° C. (1000° F.) and below about 482° C. (900° F.). Thus, petroleum distillate feedstocks are often recovered from crude oil fractionation or distillation operations, and optionally following one or more hydrocarbon conversion reactions. However, petroleum distillate feedstocks may be utilized from any convenient source such as tar sand extract (bitumen) and gas to liquids conversion products, as well as synthetic hydrocarbon mixtures such as recovered from shale oil or coal.

Highly aromatic, substantially dealkylated hydrocarbons, especially suitable as petroleum distillate feedstocks, are produced during fluid catalytic cracking (FCC) of vacuum gas oils to produce high octane gasoline boiling range hydrocarbons. FCC is a thermally severe process which is operated without the presence of added hydrogen to reject carbon to coke and to produce residual fractions. During catalytic cracking, the high molecular weight feedstock disproportionates into relatively hydrogen-rich light liquids and aromatic, hydrogen-deficient heavier distillates and residues. Catalytic cracking in the absence of hydrogen does not provide significant desulfurization, nor are the sulfur- and nitrogen-containing compounds of the FCC feed selectively rejected with the coke. These sulfur and nitrogen compounds therefore concentrate in heavier cracked products that are produced in significant quantities and characterized as being highly aromatic, hydrogen-deficient middle and heavy distillates with high sulfur and nitrogen levels. One such product is known in the refining industry as Light Cycle Oil (LCO), which is often characterized in the industry as a "cracked stock" or "cracked stock boiling in the distillate range." References throughout this disclosure to a "distillate" or a "petroleum distillate feedstock" are therefore understood to include converted hydrocarbon products, such as LCO, having boiling ranges that are representative of distillate fractions.

Highly aromatic petroleum distillate feedstocks such as LCO therefore comprise a significant fraction of polyaromatics such as 2-ring aromatic compounds (e.g., fused aromatic rings such as naphthalene and naphthalene derivatives) as well as multi-ring aromatic compounds. Typically, the combined amount of 2-ring aromatic compounds and multi-ring aromatic compounds is at least about 40% by weight, normally at least about 60% by weight, and often at least about 70% by weight, of the petroleum distillate feedstock, whereas the amount of mono-ring aromatic compounds (e.g., benzene at benzene derivatives such as alkylaromatic compounds) typically represents at most about 40% by weight, normally at most about 25% by weight, and often at most about 15% by weight, of the petroleum distillate feedstock.

Petroleum distillate feedstocks suitable for use according to exemplary embodiments contain organic nitrogen compounds and organic sulfur compounds. For example, LCO and other petroleum distillate feedstocks typically contain from about 0.1% to about 4%, normally from about 0.2% to about 2.5%, and often from about 0.5% to about 2%, by weight of total sulfur, substantially present in the form of organic sulfur compounds such as alkylbenzothiophenes. Such petroleum distillate feedstocks also generally contain from about 100 ppm to about 1000 ppm, and normally from about 100 ppm to about 750 ppm, by weight of total nitrogen, substantially present in the form of organic nitrogen compounds such as non-basic aromatic compounds including cabazoles. The petroleum distillate feedstock may be pretreated.

Figure 2:
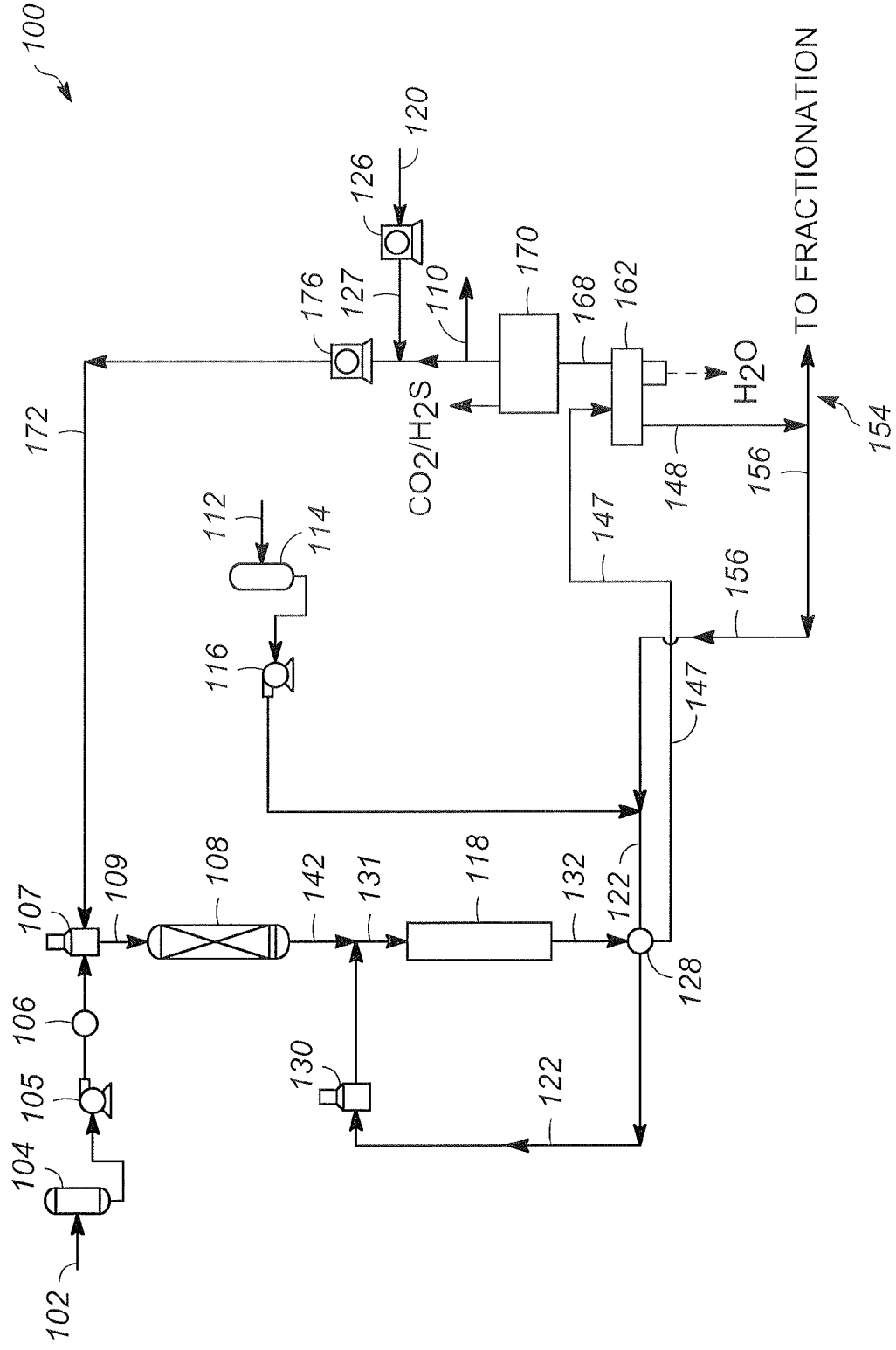
FIG. 2 is a simplified schematic diagram of a system for co-processing a biorenewable feedstock and a sulfur-containing petroleum distillate feedstock, according to an exemplary embodiment of the present invention.
Figure 3:
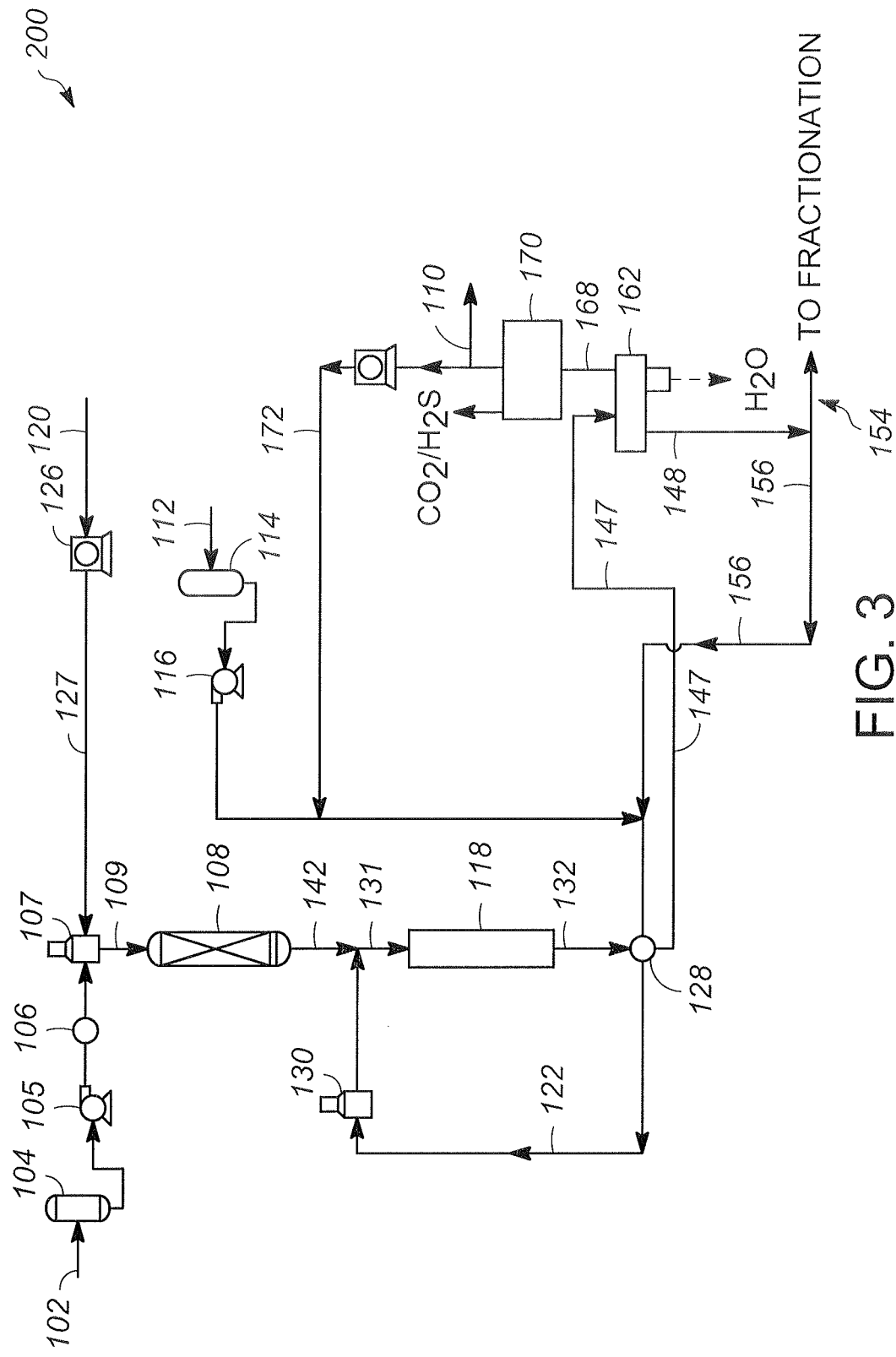
FIG. 3 is a simplified schematic diagram of a system for co-processing a biorenewable feedstock and a sulfur-containing petroleum distillate feedstock, according to another embodiment of the present invention.
Figure 4:
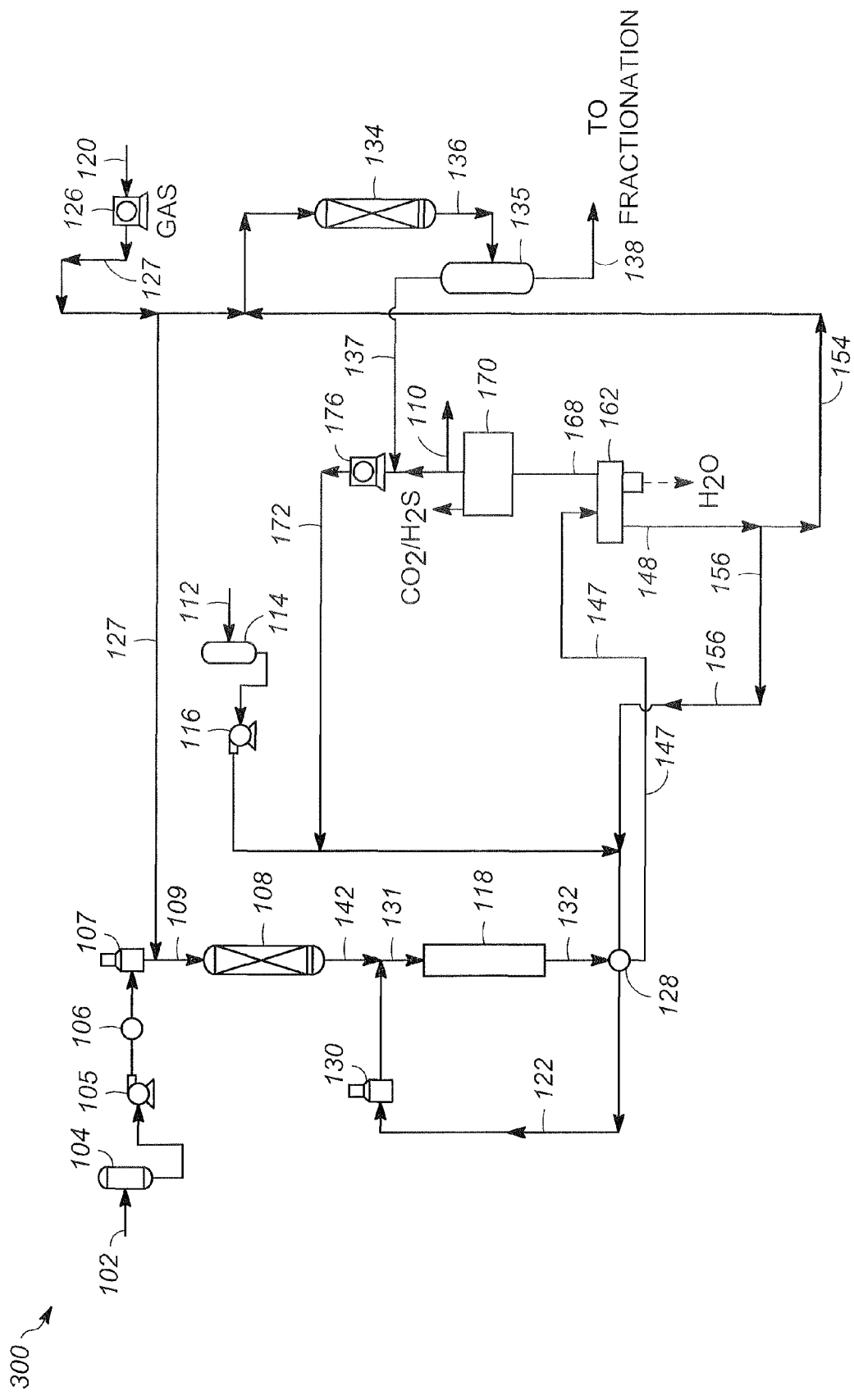
FIG. 4 is a simplified schematic diagram of a system for co-processing a biorenewable feedstock and a sulfur-containing petroleum distillate feedstock, according to another embodiment of the present invention.

Referring to exemplary systems 100, 200, and 300 illustrated respectively in FIGS. 2-4, where like numerals represent like elements in the figures, a feed transfer pump (not shown) brings the petroleum distillate feedstock 102 into a distillate feed surge drum 104. The petroleum distillate feedstock flows from the distillate feed surge drum via a distillate charge pump 105 to a distillate gas exchanger 106 where it is heated and then additionally heated in a distillate heater 107 with hydrogen gas to produce a petroleum distillate feed 109. In an embodiment, the hydrogen gas comprises hydrogen recycle gas 172 (FIG. 2). In accordance with another embodiment, the hydrogen gas comprises fresh hydrogen gas 120, usually made by reforming a natural gas. The fresh hydrogen gas is compressed in a fresh hydrogen gas compressor 126 to form compressed fresh hydrogen gas 127 (FIGS. 3 and 4) that passes to the distillate heater 107. Production of the hydrogen recycle gas is hereinafter described.

Referring again to FIG. 1, process 10 continues by reacting the petroleum distillate feedstock containing sulfur with the hydrogen gas in the presence of a hydrotreating catalyst under hydrotreating conditions to form an effluent mixture 142 (step 14). The effluent mixture comprises hydrogen sulfide and desulfurized hydrocarbons. The desulfurized hydrocarbons become part of the hydrocarbon fraction that is fractionated into the green diesel fuel as hereinafter described. The organic sulfur compounds in the petroleum distillate feedstock are converted into hydrogen sulfide ($H_2S$). The organic nitrogen compounds are converted into ammonia ($NH_3$). Referring again to FIGS. 2-4, the petroleum distillate feedstock is reacted in a hydrotreating reactor 108. As noted previously, "hydrotreating" refers to desulfurization and denitrogenation of the petroleum distillate feedstock containing sulfur and nitrogen. Hydrotreating catalysts and conditions are known to one skilled in the art. Exemplary hydrotreating catalysts comprise Group VIII metals such as nickel and/or cobalt and Group VI metals such as molybdenum and/or tungsten on a high surface area support such as alumina The Group VIII metal typically comprises about 2 to about 20 weight percent and the Group VI metal typically comprises about 1 to about 25 weight percent. Exemplary hydrotreating conditions comprise a temperature of about 260° C. to about 454° C., a hydrogen partial pressure of about 2000 kPa to about 14000 kPa (typically about 4000 kPa to about 7000 kPa), and a liquid hourly space velocity (LHSV) of about 0.5 $hr^{-1}$ to about $10 hr^{-1}$ (typically about 1 $hr^{-1}$ to about 3 $hr^{-1}$).

Referring again to FIG. 1 and to FIGS. 2-4, process 10 continues by contacting a combined feed 131 comprising the effluent mixture 142, a recycle liquid 156 (produced as hereinafter described), and biorenewable feedstock 112 in a reaction zone of a treating reactor 118 with a deoxygenation catalyst under reaction conditions to provide a reaction product 132. (step 16). The effluent mixture 142 from the hydrotreating reactor 108 mixes with the fresh biorenewable feedstock 112 from a feed surge drum 114. The biorenewable feedstock 112 flows from the feed surge drum 114 via a charge pump 116. A feed transfer pump (not shown) brings the fresh biorenewable feedstock 112 into the feed surge drum 114 via a feed filter (not shown), where particulate matter is removed. A variety of different biorenewable feedstocks may be converted into green diesel fuel and co-products. These include conventional vegetable oils, animal fats, and second generation oils such as jatropha, camelina, and algal oils. The biorenewable feedstocks that can be used include any of those that comprise primarily triglycerides and Free Fatty Acids (FFA). These compounds contain n-paraffin chains having 10-22 carbon atoms. The n-paraffin chains in the triglycerides or FFAs can be mono, di, or poly-unsaturated. The biorenewable feedstock may be pretreated to remove contaminants as well known in the art. The combined feed comprises greater than 50 weight percent (wt. %) biorenewable feedstock (about 51 wt. % to about 99 wt. %) and about 1.0 to about 50 wt. % petroleum distillate feedstock. The combined feed comprises recycle liquid in a ratio of about 0.1:1 recycle liquid to biorenewable feedstock, preferably in a ratio of about 1:1 to about 4:1 recycle liquid to biorenewable feedstock. While the inclusion of recycle liquid in the combined feed has been described, it is to be appreciated that inclusion thereof may be optional depending upon various processing considerations.

The amount of petroleum distillate feedstock containing sulfur that is fed to the hydrotreating reactor is controlled to maintain at least about 150 ppm sulfur in the combined feed 131. The amount of sulfur introduced can be controlled by controlling the ratio of petroleum distillate feedstock to biorenewable feedstock. If more sulfur is needed, the ratio of petroleum distillate feedstock to biorenewable feedstock is increased. The amount of petroleum distillate feedstock introduced into the hydrotreating reactor is dependent on the sulfur content of the petroleum distillate feedstock. Thus, for example, in order to introduce 1500 ppm sulfur into the treating reactor (in the form of $H_2S$), a requisite amount of sulfur is needed from the petroleum distillate feedstock. If the biorenewable feedstock has, for example, no sulfur and the petroleum distillate feedstock has 15000 ppm sulfur, a ratio of about 10% petroleum distillate feedstock to about 90% biorenewable feedstock would introduce the 1500 ppm sulfur in the treating reactor. A combined feed comprising 1% petroleum distillate feedstock is unlikely to supply the required amount of sulfur for maintaining at least 150 ppm sulfur in the combined feed. If a high percentage of biorenewable feedstock is to be processed, and the concentration of sulfur in the petroleum distillate feedstock is too low, it may be necessary to use a supplemental source of sulfur.

In the treating reactor 118, the combined feed 131 is contacted with a deoxygenation catalyst at the reaction conditions to hydrogenate the olefinic or unsaturated portions of the n-paraffinic chains in the feedstock. Deoxygenation catalysts and reaction conditions are well known in the art. The deoxygenation catalysts are also capable of catalyzing decarboxylation and/or hydrodeoxygenation of the feedstock to remove oxygen therefrom. Decarboxylation and hydrodeoxygenation are herein collectively referred to as deoxygenation reactions. The $H_2S$ from the hydrotreating reactor sulfides the deoxygenation catalyst during such process thereby maintaining catalyst performance, in accordance with an exemplary embodiment.

The reaction product 132 from the treating reactor 118 comprises a liquid fraction 148 and a gaseous fraction 168. The two-phase reaction product 132 may be cooled (not shown) to produce cooled reactor effluent 147 that is separated in a cold separator 162 into the liquid and gaseous fractions 148 and 168. The cooled reactor effluent stream 147 enters the cold separator 162, where a liquid water phase present at temperatures below the water dew point is separated from cold product liquid. The water is withdrawn and sent to a sour water stripper (not shown). In accordance with an exemplary embodiment as illustrated in FIGS. 2 and 3, the cold product liquid (i.e., the liquid fraction 148) is withdrawn from the cold separator and a first portion 154 thereof reheated (not shown) before being sent to a fractionation unit (not shown) for recovery of the green diesel product. While co-processing in accordance with exemplary embodiments of the present invention helps improve the cold flow properties of the green diesel fuel over a green diesel fuel produced without co-feeding of the petroleum distillate feedstock, it may be desirable to further improve the cold flow properties of the liquid fraction before fractionation by isomerizing the liquid fraction to produce a green diesel fuel having superior cold flow properties, as hereinafter described (not shown in FIGS. 2 and 3). The liquid fraction comprises a blend of hydrocarbons (substantially all n-paraffins) from the biorenewable feedstock and the petroleum feedstock that contains iso/normal paraffins, naphthenes, and aromatics. The higher the amount of biorenewable feedstock in the combined feed, the higher the cetane number and the worse the cold flow properties.

In accordance with an alternative exemplary embodiment as illustrated in FIG. 4, the first portion 154 of the liquid fraction may be isomerized in an isomerization reactor 134 to form an isomerization product 136. The first portion 154 of the separated liquid fraction from the cold separator 162 may be introduced, with fresh hydrogen gas 120, into the isomerization reactor 134 under known isomerization conditions using a known isomerization catalyst to at least partially isomerize the n-paraffins in the liquid fraction into isoparaffins to produce the isomerization product 136. The isomerization product 136 is introduced into an isomerization separator 135 for separation into a vapor stream 137 that forms part of the stream of hydrogen recycle gas 172 and a hydrocarbon liquid stream 138 that is sent to the fractionation unit (not shown) to produce a green diesel fuel having superior cold flow properties. It is to be appreciated that isomerization can be carried out in a separate bed of the same treating reactor described above or it can be carried out in a separate isomerization reactor.

Referring again to FIGS. 2-4, if the combined feed is to include recycle liquid, a second portion 156 of the liquid fraction may be recycled, after mixing with fresh biorenewable feedstock, to the treating reactor 118 as recycle liquid. A mixture 122 of the recycle liquid 156 and the fresh biorenewable feedstock 112 is heated in a combined feed exchanger 128. The mixture 122 of recycle liquid and fresh biorenewable feedstock may then be additionally heated in the combined feed treating heater 130 before combining with the effluent mixture 142 to form the combined feed 131 that is introduced into the treating reactor 118 for conversion of the biorenewable feedstock as previously described. The additional heat input may not be required, for example, if the amount and/or temperature of the petroleum distillate feedstock itself are sufficiently high. The biorenewable feedstock may be diluted with the recycle liquid up to about a 4:1 ratio of recycle liquid to biorenewable feedstock to moderate the high heat of reaction in the treating reactor. Co-feeding the effluent mixture with the recycle liquid and biorenewable feedstock into the treating reactor 118 reduces the required heat input into the biorenewable feedstock and recycle liquid. The effluent mixture also acts as a recycle liquid diluent for moderating the high heat of the deoxygenation reaction such that the amount of recycle liquid may be reduced or the recycle liquid eliminated (i.e., substantially all the liquid fraction is processed downstream to produce green diesel fuel.). As noted previously, the inclusion of recycle liquid in the combined feed is optional depending upon certain processing parameters. The recycle oil can help with management of the exothermic deoxygenation reaction, catalyst stability, as well as permitting more selective conversion of the biorenewable feedstock. If these issues are otherwise addressed, recycle liquid may not be included in the combined feed.

Referring again to FIGS. 2-4, the gaseous fraction 168 is withdrawn from the cold separator 162. The gaseous stream from the cold separator comprises unreacted hydrogen, dilute $H_2S$, carbon dioxide from the decarboxylation reaction in the treating reactor, carbon monoxide (CO), and the propane and other light hydrocarbons which are generated during the process. The gaseous fraction is treated in a recycle gas scrubber 170 to at least partially remove the $CO_2$ to produce the hydrogen recycle gas 172. The carbon dioxide can be removed by means well known in the art such as absorption with an amine, reaction with a hot carbonate solution, pressure swing absorption, etc. The recycle gas scrubber 170 also removes the dilute $H_2S$ from the gaseous stream.

It is common practice to vent or purge a portion of the hydrogen recycle gas in order to remove at least a portion of the light hydrocarbons from the system (hereinafter referred to as "purge gas" 110). The hydrogen lost in the purge is made up with fresh hydrogen. Referring to FIG. 2, the fresh hydrogen 120, usually made by reforming a natural gas, is fed to the system through a makeup gas compressor 126 in a makeup gas line to replace the lost (i.e., consumed) hydrogen (hereinafter referred to as "makeup hydrogen gas"). The hydrogen recycle gas thus comprises unreacted hydrogen, any makeup hydrogen gas, residual $CO_2$ not removed by the recycle gas scrubber, and CO. In accordance with an exemplary embodiment as illustrated in FIG. 2, the hydrogen recycle gas is compressed through the hydrogen recycle gas compressor 176 and recycled to mix with the petroleum distillate feedstock, as previously described. The hydrogen recycle gas may be heated before mixing with the petroleum distillate feedstock.

In accordance with another exemplary embodiment, as illustrated in FIG. 3, the hydrogen recycle gas is recycled to the treating reactor and fresh hydrogen gas only mixes with the petroleum distillate feedstock, as previously described. The fresh hydrogen gas has higher purity than recycle hydrogen gas which minimizes the impact of residual CO on hydrotreating of the petroleum distillate feedstock. Residual CO may reduce desulfurization activity of the hydrotreating reactor. The source of fresh hydrogen gas may be the makeup hydrogen gas that is already provided in the system to replace the hydrogen consumed in the treating reactor. While the makeup hydrogen gas is shown in FIG. 3 to be fed only to mix with the petroleum distillate feedstock, it is to be appreciated that the makeup hydrogen gas line may be split to provide makeup hydrogen gas to both the hydrotreating reactor and to replace consumed hydrogen in the treating reactor. The total amount of makeup hydrogen gas is the amount of hydrogen consumed in the hydrotreating reactor and the amount of hydrogen consumed in the treating reactor. As the hydrogen requirements for the desulfurization reactor are relatively small relative to the hydrogen requirements for the treating reactor, the total amount of makeup hydrogen gas is substantially the same in FIGS. 2 and 3. Referring to FIG. 4, whatever fresh hydrogen gas is unused (not consumed) in the isomerization reactor is passed to the treating reactor.

Accordingly, a method for co-processing biorenewable feedstock and petroleum distillate feedstock has been provided. From the foregoing, it is to be appreciated that the exemplary embodiments of the method for co-processing biorenewable feedstock and petroleum distillate feedstock sulfide the deoxygenation catalyst helping to maintain its performance and reduce or substantially eliminate the amount of external sulfiding agent required. The exemplary embodiments of the method also help improve the cold flow properties of the green diesel fuel produced from such co-processing, help moderate the high heat of reaction such that the recycle liquid rate can be minimized or recycle liquid eliminated, and helps minimize the required heat input into the biorenewable feedstock and recycle liquid.

While at least one exemplary embodiment has been presented in the foregoing detailed description of the invention, it should be appreciated that a vast number of variations exist.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for co-processing a biorenewable feedstock and a petroleum distillate feedstock, the method comprising the steps of:
   reacting a petroleum distillate feedstock containing sulfur with hydrogen gas in the presence of a hydrotreating catalyst and forming an effluent mixture comprising hydrogen sulfide; and
   contacting a combined feed comprising the effluent mixture the biorenewable feedstock, and a recycle liquid in a ratio of about 0.1:1 to about 4:1 recycle liquid to biorenewable feedstock with hydrogen gas in a reaction zone with a deoxygenation catalyst under reaction conditions to provide a reaction product comprising a hydrocarbon fraction, the combined feed comprising greater than 50 weight percent biorenewable feedstock.

2. The method of claim 1, wherein the step of reacting a petroleum distillate feedstock containing sulfur with hydrogen gas comprises reacting the petroleum distillate feedstock containing sulfur with recycle hydrogen gas.

3. The method of claim 1, wherein the step of reacting a petroleum distillate feedstock containing sulfur with hydrogen gas comprises reacting the petroleum distillate feedstock containing sulfur with fresh hydrogen gas.

4. The method of claim 1, wherein the step of reacting a petroleum distillate feedstock comprises controlling a ratio of the petroleum distillate feedstock to the biorenewable feedstock in the combined feed.

5. The method of claim 1, wherein the step of reacting the petroleum distillate feedstock containing sulfur comprises reacting the petroleum distillate feedstock with the hydrogen gas under hydrotreating conditions comprising a temperature of about 260° C. to about 454° C., a hydrogen partial pressure of about 2000 kPa to about 14000 kPa, and a liquid hourly space velocity of about 0.5 hr$^{-1}$ to about 10 hr$^{-1}$.

6. The method of claim 1, wherein the step of contacting combined feed comprises contacting the combined feed with hydrogen recycle gas.

7. The method of claim 1, wherein the step of contacting a combined feed comprises contacting the combined feed in the reaction zone of a treating reactor.

8. The method of claim 1, further comprising the steps of:
   providing the petroleum distillate feedstock containing sulfur;
   contacting the petroleum distillate feedstock with the hydrotreating catalyst under hydrotreating conditions using hydrogen recycle gas or fresh hydrogen gas to convert at least a portion of the sulfur to hydrogen sulfide in the effluent mixture; and
   contacting the combined feed comprising the effluent mixture, a recycle liquid, and the biorenewable feedstock with a deoxygenation catalyst under reaction conditions using hydrogen gas to provide the reaction product comprising the hydrocarbon fraction and to maintain the deoxygenation catalyst in sulfided form with the hydrogen sulfide.

9. The method of claim 8, wherein the step of contacting a combined feed comprises adjusting a ratio of petroleum distillate feedstock to the biorenewable feedstock to at least meet sulfur requirements.

10. The method of claim 8, wherein the step of contacting the combined feed comprises contacting the combined feed with hydrogen recycle gas.

11. The method of claim 8, wherein the step of contacting the combined feed comprises contacting the combined feed in the reaction zone of a treating reactor.

12. The method of claim 8, further comprising the step of pretreating the petroleum distillate feedstock prior to the step of contacting the petroleum distillate feedstock step.

13. The method of claim 1, further comprising the steps of:
   introducing the petroleum distillate feedstock with hydrogen gas into a hydrotreating reactor in the presence of the hydrotreating catalyst under hydrotreating conditions comprising a temperature of about 260° C. to about 454° C., a hydrogen partial pressure of about 2000 kPa to about 14000 kPa, and a liquid hourly space velocity of about 0.5 hr$^{-1}$ to about 10 hr$^{-1}$ to form the effluent mixture comprising hydrogen sulfide; and
   co-feeding the combined feed comprising the effluent mixture, a recycle liquid, and the biorenewable feedstock to a reaction zone at reaction conditions in the presence of the deoxygenation catalyst to provide the reaction product and to maintain a minimum of at least about 150 ppm sulfur in the combined feed.

14. The method of claim 13, wherein the step of introducing a petroleum distillate feedstock with hydrogen gas comprises introducing the petroleum distillate feedstock with hydrogen recycle gas.

15. The method of claim 13, wherein the step of introducing a petroleum distillate feedstock with hydrogen gas comprises introducing the petroleum distillate feedstock with fresh hydrogen gas.

16. The method of claim 13, wherein the step of co-feeding effluent mixture, recycle liquid, and biorenewable feedstock comprises adjusting the amount of effluent mixture to biorenewable feedstock in the combined feed.

* * * * *